(12) United States Patent
Fahldieck

(10) Patent No.: US 8,794,425 B2
(45) Date of Patent: Aug. 5, 2014

(54) DEVICE FOR GRIPPING PET BOTTLES IN BOTTLE-FILLING SYSTEMS OR THE LIKE

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 359 days.

(21) Appl. No.: 13/121,723

(22) PCT Filed: Oct. 28, 2009

(86) PCT No.: PCT/EP2009/007688
§ 371 (c)(1),
(2), (4) Date: Mar. 30, 2011

(87) PCT Pub. No.: WO2010/060514
PCT Pub. Date: Jun. 3, 2010

(65) Prior Publication Data
US 2011/0203906 A1    Aug. 25, 2011

(30) Foreign Application Priority Data
Nov. 3, 2008   (DE) .................. 10 2008 055 616

(51) Int. Cl.
*B65G 47/84* (2006.01)
*B67C 3/24* (2006.01)

(52) U.S. Cl.
USPC .................. 198/472.1; 198/470.1; 198/475.1; 198/867.05

(58) Field of Classification Search
USPC ......... 198/470.1, 472.1, 475.1, 803.3, 803.4, 198/803.6, 867.04, 867.05; 294/90, 99.1, 294/106, 110.1
See application file for complete search history.

(56) References Cited

U.S. PATENT DOCUMENTS

| | | | | |
|---|---|---|---|---|
| 4,943,099 A * | 7/1990 | Gabriel | .................. | 294/82.32 |
| 4,968,081 A * | 11/1990 | Beight et al. | .................. | 294/104 |
| 6,209,710 B1 * | 4/2001 | Mueller et al. | .................. | 198/470.1 |
| 6,354,427 B1 * | 3/2002 | Pickel et al. | .................. | 198/470.1 |
| 6,626,476 B1 * | 9/2003 | Govzman et al. | .................. | 294/119.1 |
| 7,784,603 B2 * | 8/2010 | Burgmeier | .................. | 198/472.1 |
| 8,128,142 B2 * | 3/2012 | Glotzl | .................. | 294/116 |
| 8,225,923 B2 * | 7/2012 | Fahldieck | .................. | 198/476.1 |
| 8,297,671 B2 * | 10/2012 | Knieling et al. | .................. | 294/90 |
| 8,342,314 B2 * | 1/2013 | Michel | .................. | 198/468.5 |

FOREIGN PATENT DOCUMENTS

| | | |
|---|---|---|
| DE | 10325137 | 1/2005 |
| DE | 202005002924 | 3/2006 |
| DE | 102005014838 | 10/2006 |
| DE | 102005041929 | 3/2007 |
| DE | 102006012020 | 9/2007 |
| EP | 1088604 | 9/1960 |
| EP | 1375395 | 1/2004 |
| EP | 1868746 | 12/2007 |
| IT | 1296413 | 6/1999 |
| WO | 03/068643 | 8/2003 |

* cited by examiner

*Primary Examiner* — Douglas Hess
(74) *Attorney, Agent, or Firm* — Occhiuti & Rohlicek LLP

(57) ABSTRACT

An apparatus for gripping a PET bottle in a bottling plant includes gripper arms and a holding element for holding the gripper arms. The holding element is mounted to deflect by rotating around a vertical axis. The apparatus also includes a centering device that forces the gripper arms back into a centered position after a deflection thereof.

14 Claims, 2 Drawing Sheets

DEVICE FOR GRIPPING PET BOTTLES IN BOTTLE-FILLING SYSTEMS OR THE LIKE

CROSS-REFERENCE TO RELATED APPLICATIONS

Figure 2:
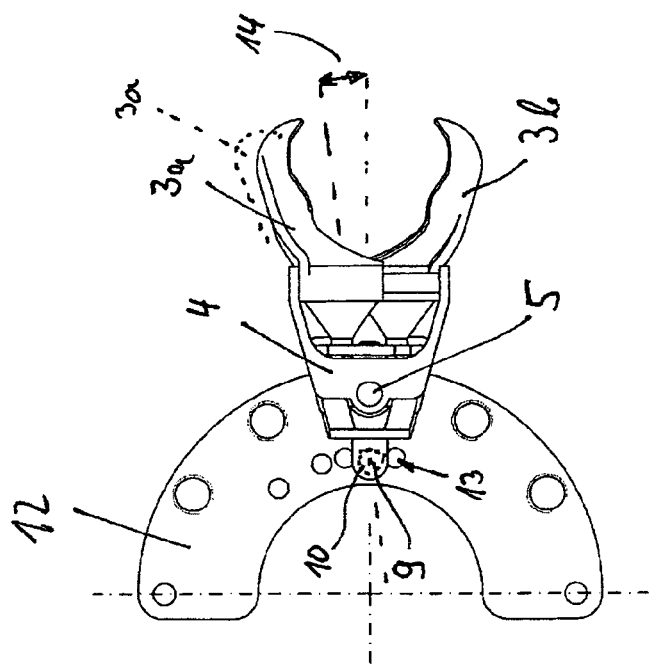

This application is the National Stage of International Application No. PCT/EP2009/007688, filed on Oct. 28, 2009, which claims the priority of German Patent Application No. 10 2008 055 616.5, filed on Nov. 3, 2008. The contents of both applications are hereby incorporated by reference in their entirety.

The invention is aimed at a device for gripping PET bottles in bottling plants, especially for the transfer of crown to crown/bottler/rinser or similar.

Such grippers, especially those which are furnished with a driven opening and closing mechanism, i.e. so called active grippers, are known in very differing configurations. Just to mention a few examples, refer to DE 103 25 137 A, DE 10 2005 014 838 A or DE 10 2005 041 929 A, whereby the latter features gripper arms synchronised via gears, which are furnished with attachments with permanent magnets, in order to perform gripping actions, for instance with simultaneously mutually repelling or attracting permanent magnets, such that the sum of the repelling or attracting forces acting on the gripper arms in the gripping/slewing direction, essentially remain constant.

Because the transfer crowns to which such grippers are positioned, are driven individually by servo motors, they are not always 100% synchronous, for example with assigned machines, like bottlers, etc. Therefore it may be necessary for the grippers to have a certain amount of horizontal play in order to compensate for these asynchronous effects and to prevent destruction.

The task of the invention therefore consists of allowing small horizontal deviation movements of the gripper, with simultaneous execution of a reset force to the originally aligned position of the gripper arms.

According to the invention this task is performed by a device described above, by the holding element of the gripper arms mounted around a vertical axis parallel to the centre bottle axis and is furnished with a centring device, which forces the gripper arms back into the centred position after a sideways deviation movement.

A particularly functional arrangement of the invention is that the centring device is formed by magnets in the holding element on the one hand and on the other hand by the transfer crown. These magnets are preferably permanent magnets, without the invention being limited to these.

An advantage of the invention for active grippers controlled via cams, is thereby constituted by the fact that these cams need not be changed or adjusted for differing mouth diameters. The closing movement is always constant, if such a gripper has gripped a bottle with a larger mouth, then before the tangential point, a bottle with a smaller mouth only after the tangential point. In this way lateral forces are also generated, for instance because of the rigid bottle support of the bottler, fixing the bottle while it is already held by the active gripper.

For small pitch circles curved dipping tracks result in the bottle in the grippers, which can lead to collisions with the gripper tip. In this way the gripper can handle large mouths (e.g. 38) with pitch circles of for example 36 mm without a collision with the gripper tip, but for larger mouths evasion is required to prevent damage to the gripper tip, which is achieved by the invention on hand.

According to the invention, another appropriate arrangement is that the holding element features an attachment furnished with permanent magnets for traversing the resetting magnets positioned in the transfer crown. This ensures a very simple, cost-effective design, which becomes even more efficient through a further arrangement of the invention, which is constituted by the magnets being moulded into the attachment of the holding element and/or transfer crown.

Moulding of for instance the permanent magnets into the machine elements, which normally consist of plastic, it is achieved that the entire device can be cleaned easily, because resetting springs, which are difficult to clean, can be done away with entirely. The magnets are also corrosion protected and completely free of wear and tear due to contactless movement. Provision can be made for the magnets to be mutually repelling or attracting in the relevant device.

Figure 1:
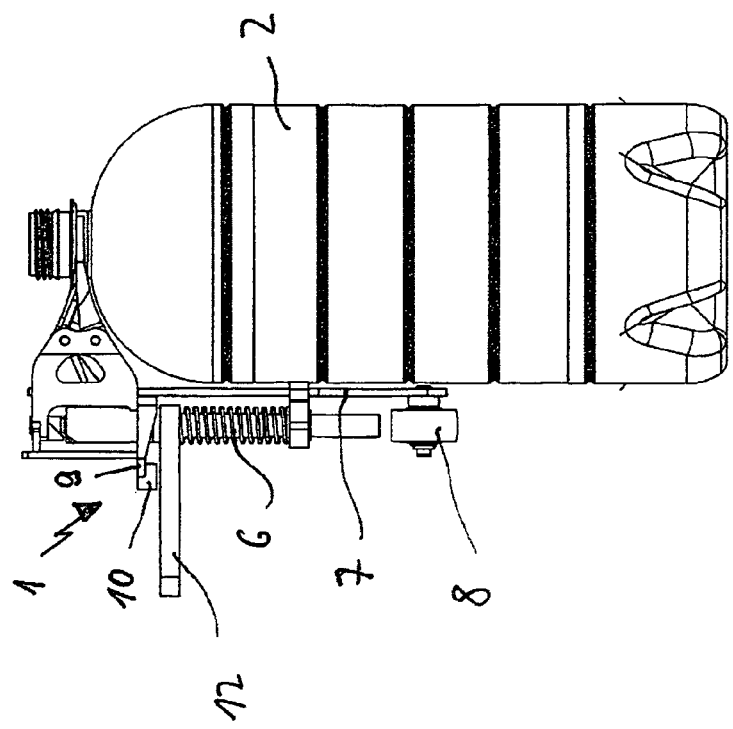
Figure 3:
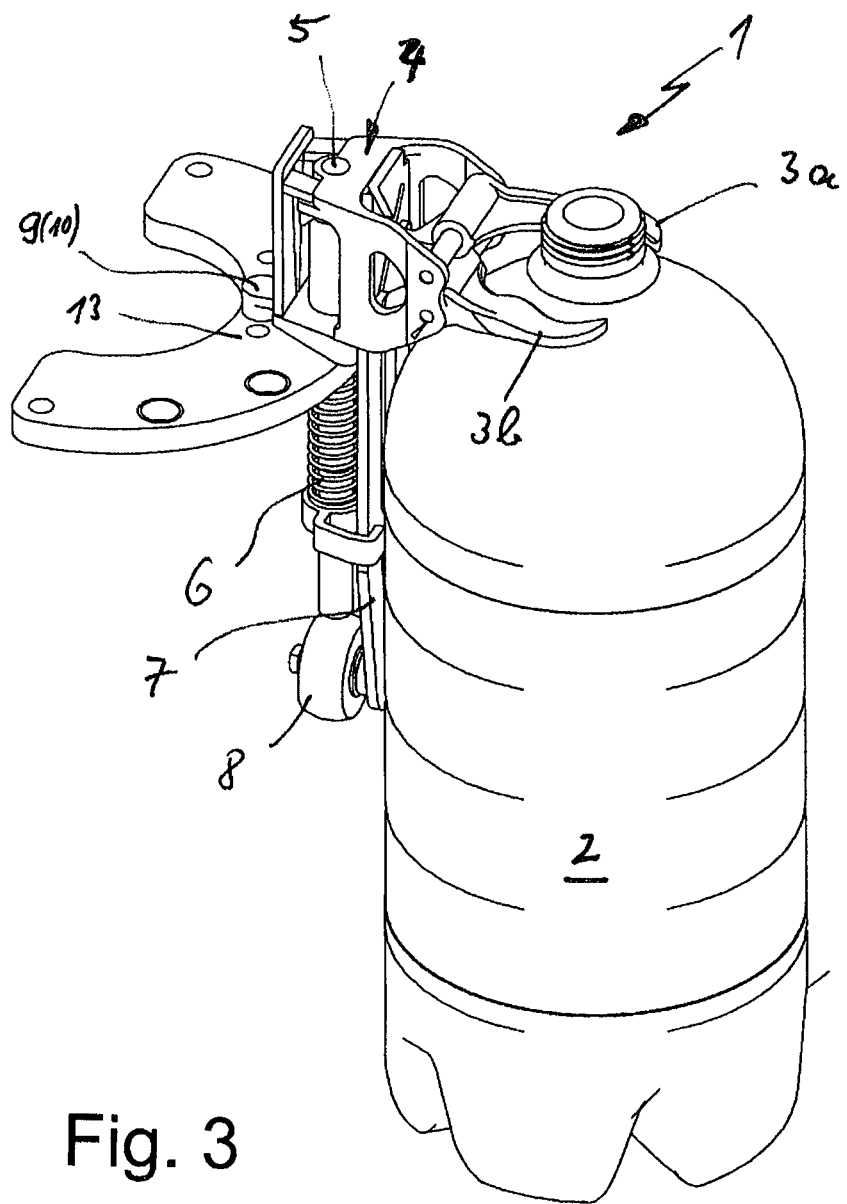

Further details, features and advantages of the invention become evident, based on the following description and drawing. It shows in FIG. 1 a lateral view of an active gripper according to the invention
a) with shown open PET bottle,
FIG. 2 a top view of a gripper without additional
a) elements as in
FIG. 3 in spatial presentation a gripper according to the
a) invention with slightly opened gripper arms.

The device generally designated with 1 in the Figures serves the purpose of gripping PET bottles 2. This device is a so called active gripper with two gripper arms 3a and 3b, controlled in the opening and closing direction, which are positioned on a holding element 4, which can be swivelled around a rotational axis 5 parallel to the bottle axis. The opening and closing movement is performed by a control plate loaded by a spring 6, which can be adjusted up or down against the force of spring 6 in FIG. 1, whereby a control curve engages a roller 8 on the control plate, which is of no immediate importance for the situation on hand.

An attachment 9 is formed onto the holding element 4 on the opposite side relative to the rotation axis 5, into which a permanent magnet is moulded which traverses a holding bracket 12 at a distance in the range where permanent magnets have been provided, which are also moulded into the plastic of the holding bracket 12 or the transfer crown.

The mode of operation is as follows: If, for instance, the holding element 4 is swayed sideways by the gripper arms 3a and 3b, which is indicated by a dotted line in FIG. 2 and designated by a double arrow, then the permanent magnets 10 and 13 jointly force the holding element 4 into the initial position when the sideways sway force diminishes. In this way bottle necks of vastly varying diameters can be gripped.

Of course the described example of the invention can be changed in many ways without abandoning the underlying thought, especially regarding the number and strength of the permanent magnets.

What is claimed is:
1. An apparatus for gripping a PET bottle in a bottling plant, said apparatus comprising gripper arms, a holding element for holding the gripper arms, the holding element being mounted to deflect by rotating around a vertical axis, a centering device that forces the gripper arms back into a centered position after a deflection thereof, and a holding bracket opposite the holding element, wherein the centering device comprises magnets at the holding element and at the holding bracket.

2. The apparatus of claim 1, wherein the holding element comprises an attachment having a first magnet and the holding bracket comprises a second magnet magnetically coupled to the first magnet.

3. The apparatus of claim 2, wherein at least one magnet comprises a magnetizable metal.

4. The apparatus of claim 2, wherein at least one magnet is molded into the attachment of the holding element.

5. The apparatus of claim 2, wherein one or more magnets in the holding bracket are configured for attracting one or more magnets in the holding element.

6. The apparatus of claim 2, wherein at least one magnet is molded into the holding bracket.

7. The apparatus of claim 2, wherein one or more magnets in the holding bracket are configured for repelling one or more magnets in the holding element.

8. An apparatus for transporting bottles, said apparatus comprising: a driven transport device having a plurality of clamps, wherein at least one of the clamps includes gripper arms, a holding element, and a centering device as recited in claim 1.

9. The apparatus of claim 8, wherein the driven transport device is a linearly driven transport device.

10. The apparatus of claim 8, wherein the driven transport device is a rotationally driven transport device.

11. A method for the transport of containers, said method comprising: providing a driven transport device having clamps, wherein at least one of the clamps includes gripper arms, a holding element, and a centering device as recited in claim 1.

12. The method of claim 11, wherein providing a driven transport device comprises providing a linearly driven transport device.

13. The method of claim 11, wherein providing a driven transport device comprises providing a rotationally driven transport device.

14. An apparatus for responding to a deflection of a gripped a bottle in a transport device, said apparatus comprising: means for gripping a bottle, means for holding the means for gripping a bottle, said means for holding being mounted to deflect by rotating around a vertical axis, means for centering said gripper arms back into a centered position after deflection thereof, and a holding bracket opposite said means for holding the means for gripping a bottle, wherein the means for centering comprises means for causing a magnetic force to urge the means for gripping to return to a central position in response to a deflection away from the central position.

* * * * *